United States Patent [19]

Warihashi

[11] 4,366,708

[45] Jan. 4, 1983

[54] PRESSURE CHECKER FOR PNEUMATIC TIRE

[76] Inventor: Hisanori Warihashi, 43-4, Daita 1-chome, Setagaya-ku, Tokyo, Japan

[21] Appl. No.: 232,370

[22] Filed: Feb. 6, 1981

[30] Foreign Application Priority Data

Feb. 7, 1980 [JP] Japan .............................. 55-13473[U]

[51] Int. Cl.³ ............................................. B60C 23/04
[52] U.S. Cl. ................................... 73/146.8; 116/270
[58] Field of Search ........................ 73/146.8; 116/270

[56] References Cited

U.S. PATENT DOCUMENTS

| | | | |
|---|---|---|---|
| 2,417,449 | 3/1947 | Rubin | 73/146.8 |
| 2,689,481 | 9/1954 | Quiat | 73/146.8 |
| 3,111,930 | 11/1963 | Zipper | 73/146.8 |
| 3,780,693 | 12/1973 | Parr | 73/146.8 |

*Primary Examiner*—Donald O. Woodiel
*Attorney, Agent, or Firm*—Stephen F. K. Yee

[57] ABSTRACT

A pressure checker for a pneumatic tire having a tire valve, including a cap member defining an open ended chamber therein and adapted for sealing threaded engagement with the tire valve, a pressing member provided in the chamber and adapted to press the tire valve open when the cap member is threaded on the tire valve, and inflatable membrane provided in the chamber and inflatable by an air pressure released from the tire when the tire valve is opened by the pressing member so that from the degree of deformation or inflation of the membrane an observer can check the air pressure of the tire.

2 Claims, 22 Drawing Figures

PRESSURE CHECKER FOR PNEUMATIC TIRE

BACKGROUND OF THE INVENTION

This invention relates to a pressure checker device for pneumatic tires of motor vehicles or the like.

Use of incorrectly inflated tires may give rise to problems of shortened service life of tires, braking difficulty and uneconomical fuel consumption. Nevertheless, it is very troublesome to drop by a service station or a service shop from time to time to have the pressure of the tires checked by some inspection equipments in order to maintain a correct pressure in the tires according to particular road conditions. There have thus far been proposed various types of pressure checkers for pneumatic tires. But, they are invariably heavy and large-scaled and are thus unsuitable for handy use on vehicle tires.

SUMMARY OF THE INVENTION

It is, therefore, an object of the present invention to provide a simple, samll-sized and inexpensive device for checking the air pressure of pneumatic tires.

Another object of the present invention is to provide a pressure checker which can indicate the air pressure of a pneumatic tire merely by threadingly fitting same in a tire valve of the tire.

In accomplishing the foregoing objects, there is provided in accordance with the present invention a pressure checker device for a pneumatic tire having a tire valve, which comprises a cap member defining an open ended chamber therein and adapted for threaded engagement with the tire valve, a packing member secured in the chamber and sealingly engageable with the tire valve so that the chamber may be hermetically sealed when the cap member is threaded on the tire valve, a pressing member provided in the chamber and adapted to press the tire valve open when the cap member is threaded on the tire valve, and an inflatable membrane provided in the chamber and inflatable by air pressure released from the tire when the tire valve is opened by the pressing member so that from the degree of deformation of the membrane an observer can check the air pressure of the tire.

BRIEF DESCRIPTION OF THE DRAWINGS

Other objects, features and advantages of the present invention will become apparent from the detailed description of preferred embodiments of the invention which follows, when considered in light of the accompanying drawings, in which.

DESCRIPTION OF THE PREFERRED EMBODIMENTS

Figure 9:
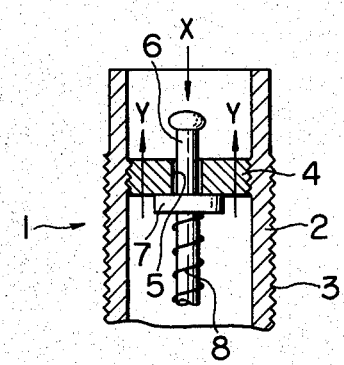
FIG. 9 is a vertical, cross-sectional view schematically showing an ordinary tire valve structure of a pneumatic tire.
Figure 10:
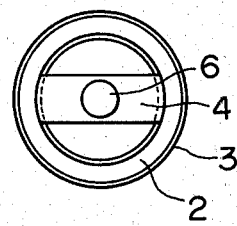
FIG. 10 is a plan view of the tire valve of FIG. 9.

Referring first to FIGS. 9 and 10, there is shown an ordinary tire valve structure of a pneumatic tire, to which the pressure checker of this invention is to be attached. The tire valve 1 has a valve body 2 which is provided with an externally threaded portion 3 on the circumference thereof. The reference numeral 4 denotes a support member which is threadedly fitted in the valve body 2 and has an axial through hole 5 to receive a pin 6. The pin 6 has a flange portion 7 below which a spring 8 is mounted for urging the pin 6 upward. Thus, the pin 6 is normally held in the position shown with the upper side of the flange 7 being engaged by the support member 4. In this state, an inner valve (not shown) operatively connected to the pin 6 is closed to prevent air leakage from the tire (not shown). If the pin 6 is pushed down in the direction of the arrow X, against the action of the spring 8, the inner valve is opened to discharge air through the valve 1 in the direction of the arrow Y.

Figure 1:
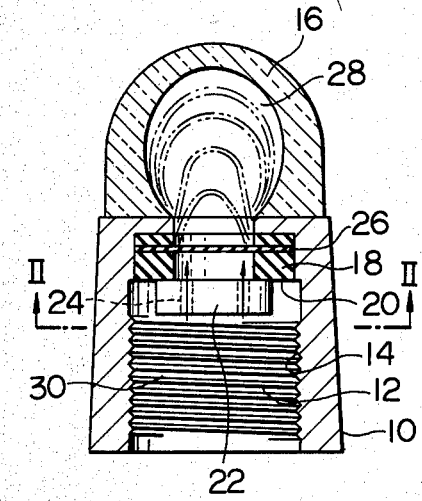
FIG. 1 is a vertical, cross-sectional view schematically showing one embodiment of the pressure checker according to the present invention.

FIG. 1 depicts one embodiment of the pressure checker according to the present invention, which is to be fitted on the tire valve shown in FIG. 9. The pressure checker includes a cap member 10 defining an open ended chamber 12 therein and being provided with internal threads 14 on its inner periphery for engagement with the external threads 3 of the tire valve 1 of FIG. 9.

The cap member 10 has its closed end portion 16 formed of a transparent material, for example, a transparent synthetic resin, so that an observer can see therethrough the inside space 12 of the cap member 10. A packing member, preferably a rubber packing 18 is secured within the chamber 12. The packing 18 has an annular portion 20 adapted for pressure contact with the upper end face of the valve body 2 such that the chamber 12 can be hermetically sealed when the cap member 10 is threaded on the tire valve 1.

Figure 2:
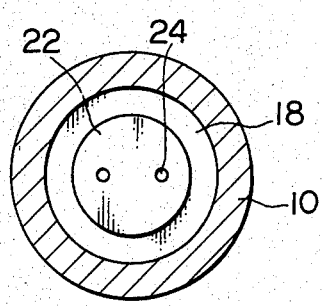
FIG. 2 is a view taken on line II—II of FIG. 1.
Figure 3:
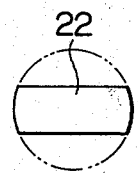
FIG. 3 is a plan view schematically showing an alternate embodiment of the pressing member.

A pressing member 22 is provided within the chamber 12, preferably on the packing 18 as shown in FIG. 1. The pressing member is so provided as to depress the pin 6 and to open the inner valve when the cap member 10 is threaded on the tire valve 1 and is sealed by the action of the packing 18. The pressing member 22 has one or more perforations 24, as shown in FIG. 2, to allow air passage therethrough. This can be also achieved by forming a cut away portion or portions at its periphery, as shown in FIG. 3.

Referring again to FIG. 1, an inflatable membrane, preferably a thin elastic rubber sheet 26, is secured within the chamber 12. The membrane 26 is adapted to be inflated upon receipt of an air pressure released from the tire. In the embodiment shown, the membrane 26 is supported at its periphery by the packing 18 and divides the chamber 12 into an upper hermetically closed space 28 and a lower open ended space 30. Thus, when the lower space 30 receives air pressure from the tire, the membrane 26 may be inflated into the closed space 28, the degree of inflation depending upon the air pressure of the tire. Therefore, from the degree of inflation or deformation of the membrane 26, the air pressure of the tire can be determined.

In use, the female screw 14 of the tire pressure checker is threaded on the male screw 3 of the tire valve 1. As the cap member 10 is turned, the upper end face of the tire valve body 2 is abutted against the lower annular side 20 of the packing 18 in the initial stage, forming therewith a hermetical seal around the pressing member 22. As the cap member 10 is further turned on the valve 1, the packing 18 is deformed and the pin 6 is depressed by the pressing member 22 in the direction of the arrow X to open the inner valve of the tire, thereby releasing the tire pressure toward the sealed space 28. As a result, the membrane 26 is inflated into the sealed space 28 in a pattern indicated by the broken lines in FIG. 1 according to the level of air pressure of the tire. The degree of the deformation or inflation of the membrane 26 represents the level of the air pressure of the tire so that an observer can instantaneously check the tire pressure by, for example, reading it on graduations directly provided on the transparent portion 16 of the cap member 10.

Figure 4:
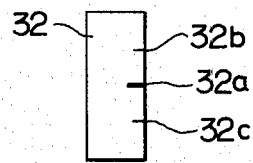
FIG. 4 is a schematic view of one embodiment of the pressure graduation.

An embodiment of the graduation is illustrated in FIG. 4, in which designated by the reference numeral 32 is a transparent sticker plate which is to be adhered on the transparent portion 16 of the cap member 10. The plate 32 has upper and lower limit lines 32b and 32c and a reference level 32a marked by a thick line at a position between the lines 32b and 32c. In adhering the sticker plate 32 at a correct position on the transparent portion 16, the pressure checker is threaded on the tire valve of a tire which has been inflated to a specified pressure at a service station or the like and then the sticker is adhered on the transparent portion 16 such that the reference level line 32a is positioned in registry with the apex of the inflated membrane 26. The air pressure of the tire can be instantaneously checked from the position of the apex of the membrane 26 relative to the graduation lines. Namely, when the apex is positioned between the lines 32b and 32c, the tire pressure may be judged to be in a proper range.

Figure 5A:
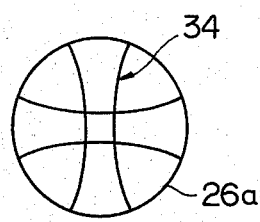
FIGS. 5(a)–5(e), 6(a)–6(e) and 7(a)–7(e) are schematic views illustrating pattern variations indicating pressure levels of the tire.
Figure 6A:
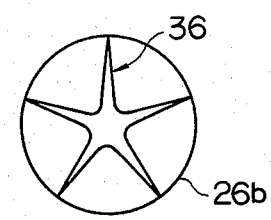
Figure 7A:
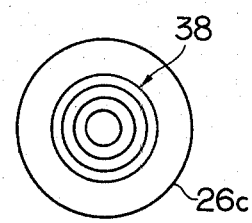
Figure 5B:
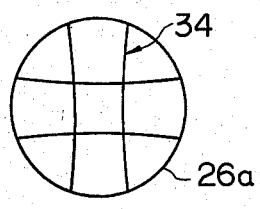
Figure 6B:
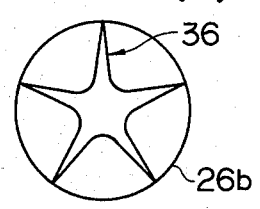
Figure 7B:
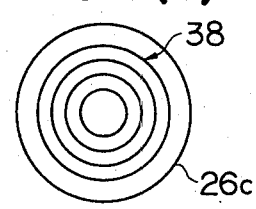
Figure 5C:
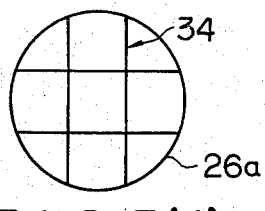
Figure 6C:
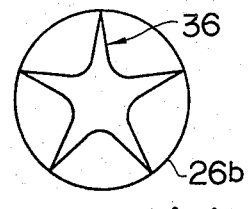
Figure 7C:
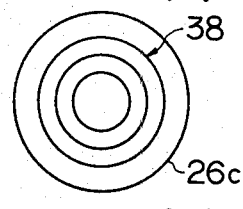
Figure 5D:
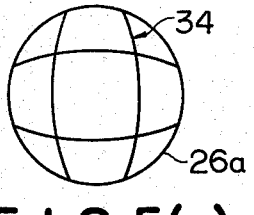
Figure 6D:
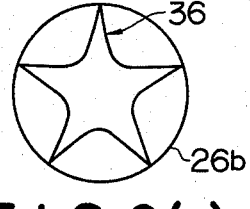
Figure 7D:
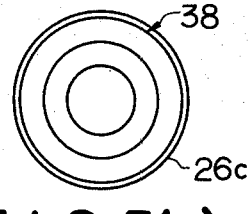
Figure 5E:
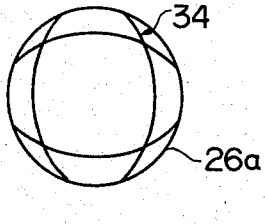
Figure 6E:
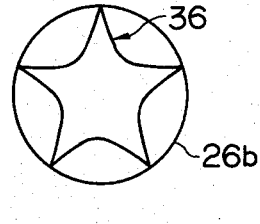
Figure 7E:
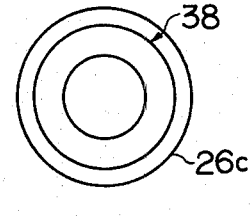

FIGS. 5(a)-5(e), 6(a)-6(e) and 7(a)-7(e) illustrate further embodiments of means for indicating the degree of deformation or inflation of the membrane 26. The membrane itself bears a pattern which is deformed upon inflation of the membrane and per se shows the degree of the inflation of the membrane. In the embodiment of FIGS. 5(a)-5(e), the membrane 26a is provided with a pattern of a combination of crossed lines 34. When the membrane 26a receives no pressure from the tire, the pattern 34 is as shown in FIG. 5(a). When the membrane 26a is applied with air pressure from the tire, the pattern 34 is deformed. FIGS. 5(b) to 5(e) show the patterns at different levels of the air pressure, for example at pressures of 1.5, 1.8, 2.0 and 2.2 Kg/cm². In the alternate embodiments of FIGS. 6(a)-6(e) and 7(a)-7(e), the membranes 26b and 26c have a stellate pattern 36 and a pattern of concentric circles 38, respectively. In the similar way to the pattern 34, the patterns 36 and 38 can be deformed as shown in FIGS. 6(a)-6(e) and 7(a)-7(e) according to the levels of pressure, for example at 0, 1.5, 1.8, 2.0 and 2.2 Kg/cm², respectively.

Obviously, it is possible to employ various forms of deformation display other than the patterns 34, 36 and 38. For example, a similar effect can be obtained by providing at a predetermined position of the membrane 26 an index portion which has a different coefficient of contraction from other portions of the membrane and which is moved a distance commensurate with the imposed air pressure. In this case, the tire pressure can be checked by reading the position of the index portion.

Figure 8:
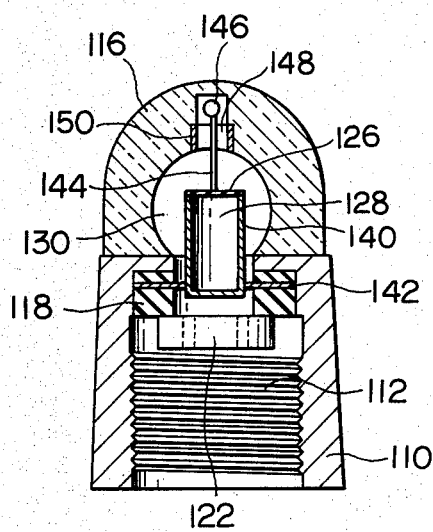
FIG. 8 is a vertical, cross-sectional view, similar to FIG. 1, showing an alternate embodiment of the pressure checker.

FIG. 8 illustrates an alternate embodiment of the pressure checker of the present invention, in which corresponding parts have been designated by the same reference numerals as part of a "100" series. In this embodiment, the degree of inflation of the membrane is indicated indirectly by a pointer or marker operatively connected to the membrane. A cap member 110 is provided with an inner casing 140 disposed therewithin. In the embodiment shown, the casing 140 is supported by a supporting member 142 which in turn is fixed by a packing 118 to the cap member 110. The supporting member 142 is provided with one or more perforations to allow air passage therethrough.

The inner casing 140 has a top, open ended portion covered with an inflatable membrane 126, such as an elastic rubber sheet, thereby dividing the inside space 112 of the cap member 110 into an open ended space 130 and a hermetically sealed space 128 defined by the inner casing 140 and the membrane 126. A connecting rod 144 is fixed at one end to the center of the membrane 126, and the free end of the rod is provided with a pointer 146 located within a concave guide 148 formed in a transparent portion 116 of the cap member 110. Thus, the pointer 146 may slide down along the guide 148 when the membrane 126 is inflated.

In operation, the cap member 110 is fitted on the tire valve 1 of FIG. 9 and turned, whereby the open ended space 130 is hermetically sealed by the packing 118. By further turning the cap member 110, a pressing member 122 provided therein is engaged by the head of the pin 6 to depress it. Thus, the tire valve 1 is opened and the air in the tire is released therefrom to the space 130, thereby the membrane 126 is inflated into the closed space 128 with the pointer 146 being displaced downward along the guide 148. The stopped position of the pointer 146 indicates the degree of inflation of the membrane, i.e. the pressure of the tire. Provision of pressure graduations on a suitable portion of the transparent portion 116 of the cap 110 is advantageous for a precise check of the tire pressure. In an alternative, as shown in FIG. 8, a screen 150 may be provided on an inside surface of the concave guide 148 such that the pointer 146 is hidden thereby when the pressure of the tire is in a good range, but appears thereabove when the tire pressure is out of the allowable range.

It will be appreciated from the foregoing description that, according to the present invention, the air pressure of a tire can be instantaneously checked visually by threading the pressure checker on the valve of the tire. This contributes to the safe operations of vehicles as well as to the improvement of mileage. In addition, since the pressure level of a tire is indicated by the degree of inflation of the membrane, the pressure checker is simple is construction and less susceptible to changes by ageing. The pressure checker can usually serve as a conventional cap for a tire valve.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

I claim:

1. A device for checking the pressure of a pneumatic tire having a tire valve, comprising:

a cap member having a portion formed of transparent material and defining an open-ended chamber therein and adapted for threaded engagement with the tire valve;

a packing member secured in said chamber and sealingly engageable with the tire valve so that said chamber may be hermetically sealed when said cap member is threaded on the tire valve;

a pressing member provided in said chamber and adapted to press the tire valve open when said cap member is threaded on the tire valve; and an inflatable membrane provided in said chamber to divide said chamber into a closed space contiguous with an open-ended space and inflatable into said closed space by air pressure released into said open-ended space from the tire when the tire valve is opened by said pressing member, said membrane having a pattern on the surface facing said closed space, said pattern being deformable by inflation of said membrane so that by viewing the deformation of said pattern through said transparent portion an abserver can check the air pressure of the tire.

2. A device for checking the pressure of a pneumatic tire having a valve, comprising:

a cap member defining an open-ended chamber therein and adapted for threaded engagement with the valve;

a packing member secured in said chamber and sealingly engageable with the valve so that said chamber may be hermetically sealed when said cap member is engaged with the valve;

a pressing member provided in said chamber and adapted to open the valve when said cap member is engaged with the valve;

an inner casing disposed within said chamber and having an open-ended portion;

an inflatable membrane provided within said chamber and covering said casing open-ended portion to divide said chamber into an open-ended space and a closed space defined within said inner casing; and a ponter slidably provided within said open-ended space and operatively connected to said membrane so that said pointer may be displaced by inflation of said membrane by air pressure released from the tire when the valve is opened by said pressing member, whereby the pressure of the tire can be checked from the displaced position of said pointer.

* * * * *